United States Patent [19]
Arashi et al.

[11] 4,268,482
[45] May 19, 1981

[54] CATALYTIC REACTOR

[75] Inventors: Norio Arashi; Tadayoshi Murakami, both of Hitachi; Kiyoshi Narato, Ibaraki; Masaaki Shiga, Oharasakainishi; Tomihisa Ishikawa, Kure, all of Japan

[73] Assignees: Hitachi, Ltd.; Babcock-Hitachi K.K., both of Tokyo, Japan

[21] Appl. No.: 931,400

[22] Filed: Aug. 7, 1978

[30] Foreign Application Priority Data

Aug. 5, 1977 [JP] Japan .................................. 52-93423

[51] Int. Cl.³ ............................ B01J 8/02; F01N 3/15
[52] U.S. Cl. .................................... 422/171; 422/177; 422/180; 422/191
[58] Field of Search ............... 422/171, 177, 180, 191; 252/477 R

[56] References Cited

U.S. PATENT DOCUMENTS

| | | | |
|---|---|---|---|
| 2,084,167 | 6/1937 | Stilson | 422/198 X |
| 2,301,400 | 11/1942 | Hellan | 165/9.1 |
| 3,109,715 | 11/1963 | Johnson et al. | 422/171 |
| 3,208,131 | 9/1965 | Ruff et al. | 252/477 R |
| 3,362,783 | 1/1968 | Leak | 422/180 |
| 3,445,196 | 5/1969 | Thomas | 422/171 |
| 3,785,778 | 1/1974 | Barstein et al. | 422/171 |
| 3,819,334 | 6/1974 | Yoshida | 422/180 |
| 3,944,505 | 3/1976 | La Croix | 422/177 |
| 4,125,380 | 11/1978 | Negola | 422/171 |

FOREIGN PATENT DOCUMENTS 52-6673  3/1977  Japan ............................. 252/477 R

*Primary Examiner*—Michael S. Marcus
*Attorney, Agent, or Firm*—Craig and Antonelli

[57] ABSTRACT

A plurality of catalyst assemblies each have a plurality of sheet catalysts which are arranged in parallel to each other with distances thereby to define a plurality of gas passages. The catalyst assemblies are stacked in a catalytic reactor so that the width direction of the sheet catalysts of one of the catalyst assemblies will traverse the width direction of the sheet catalysts of each of the immediately adjacent assemblies, whereby leading edges of the sheet catalysts of each assembly are exposed to a gas to be treated rising upward in the gas passages.

11 Claims, 7 Drawing Figures

CATALYTIC REACTOR

BACKGROUND OF THE INVENTION

This invention relates to a catalytic reactor, particularly to an arrangement of catalyst in the catalytic reactor which is suitable for treatment of a gas including a lot of dusts.

For treating with a gas including a lot of dusts, fluidized bed catalytic reactors have been used widely. The catalytic reactor, however, has defects that much of the catalyst is lost due to transferring the catalyst during its operation and that the catalyst is not transferred uniformly, thereby causing non-uniform gas flows, so that the catalytic reaction may not be carried out sufficiently.

On the other hand, in order to prevent the dusts in the gas from being caught by the catalyst, there is proposed a catalytic reactor in which sheet catalysts are arranged in honey-combs to define a plurality of straight flow passages thereby, which is shown for example in Japanese Utility model No. 6673/1977. When a gas including dusts passes through the straight flow passages, the dusts are not caught to any great extent by the sheet catalysts. Therefore, the catalytic reactor of honey-comb type has such an advantage that the catalyst is not lost to any great extent during its operation.

However, there is the defect that the gas flowing in the straight flow passage is not very turbulent and has a very small mass transfer coefficient as compared with a conventional catalytic reactor of catalyst filling type, which results in failure of good contact of the gas with the catalyst or good catalytic reaction. In a view of effecting good contact of the gas and the catalyst, it is tried to make the contacting area of the straight flow passage larger by making the cross-sectional area of the flow passage smaller and increasing the number of the passages. Thus produced catalytic reactor has the defect that drafting loss of the gas increases.

SUMMARY OF THE INVENTION

An object of the invention is to provide a catalytic reactor in which catalyst is arranged such that a gas to be treated can be contacted with the catalyst well enough without increasing drafting resistance, and the catalyst is not lost to any great extent.

Another object of the invention is to provide a catalytic reactor of simple construction in which catalyst is arranged such that a gas to be treated can be contacted with the catalyst well enough without increasing draft resistance.

Briefly stated, a feature of the invention is that a plurality of catalyst groups, each including a plurality of sheet catalysts arranged in parallel to each other with distances therebetween, are stacked in a catalytic reactor so that leading edges of the sheet catalysts of each of the catalyst groups are exposed to the gas rising in the catalytic reactor.

When the plurality of sheet catalysts are disposed in parallel to a gas flow to define gas passages therebetween, coefficient of mass transfer to the surfaces of the gas passages defined by the sheet catalysts is large, particularly in regions between the leading edges of the sheet catalysts and a little downstream positions of the sheet catalysts, which region is called an entrance region or starting region. In the catalytic reactor, a plurality of such entrance regions exist in the direction of the gas flow, whereby the good catalytic reaction with the gas can be effected.

DESCRIPTION OF THE PREFERRED EMBODIMENT

First, an embodiment of a catalyst arrangement according to the invention will be explained hereinafter, referring to FIGS. 1 and 2.

Figure 1:
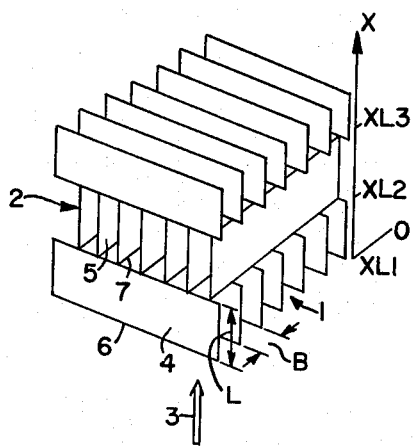
FIG. 1 is a perspective view showing a sheet catalyst arrangement according to the present invention.

In FIG. 1, a plurality of catalyst groups 1, 2 are stacked along a gas flow 3. The catalyst groups 1, 2 each comprises a plurality of sheet catalysts 4, 5 each arranged in parallel to each other with distances B therebetween. Each of the sheet catalysts 4, 5 has width W, a length L and a leading edge 6 or 7. The catalyst group 2 is stacked on the catalyst group 1 so that the length directions of the sheet catalysts 4, 5 will be in the gas flow 3, and a plurality of the leading edges 6, 7 of the sheet catalysts 4, 5 of the catalyst groups 1, 2 will be exposed to the gas flow 3, preferably so that the width directions of the sheet catalysts of one 1 of the catalyst groups 1, 2 will traverse the width directions of the immediately adjacent one 2 of the catalyst groups 1, 2.

The gas 3 to be treated enters the plurality of catalyst groups 1, 2 at their bottom and passes upward through a plurality of gas passages defined by the sheet catalysts 4, 5. The gas contacts with the side surfaces of the gas passages or the sheet catalysts 4, 5 while passing upward.

A magnitude of mass transfer rate of the gas 3 is expressed by the Sherwood number (Sh). The larger Sh is, the more frequently the gas 3 contacts with the sheet catalysts 4, 5. The condition of the contact of the gas 3 and the sheet catalysts 4, 5 will be explained hereinafter in detail, using Sh and referring to FIG. 2.

Figure 2:
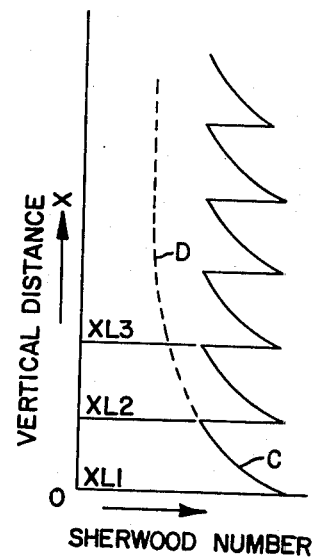
FIG. 2 is a graph showing a relation between Sherwood number and a vertical distance (x) of the sheet catalyst arrangement shown in FIG. 1.

In FIG. 2, when the gas 3 contacts with the most lower leading edge 6 at $xL_1$ shown in FIG. 1, Sh is the largest, which means that the gas 3 contacts with the catalyst well enough, and then Sh decreases gradually along a curve C as the gas 3 rises up. When the gas 3 reaches to $xL_2$ or the leading edges 7 of the sheet catalysts 5, the gas 3 is disturbed by the leading edge 7 so that Sh will become large again, and then Sh decreases gradually in the same manner as abovementioned, as the gas rises further. Thus, Sh changes as shown by the curve C as the gas goes up, and it reaches high values repeatedly.

If the length L of a sheet catalyst is longer Sh decreases along a curve D as the gas rises up. In this case, the average of Sh is very small as compared with the catalyst arrangement of FIG. 1, so that the catalyst can not contact with the gas well enough.

It is desirable that the length L of the sheet catalyst 4, 5 is proper. According to experimental results as shown in FIGS. 6 and 7, the length L, which is influenced by a distance B (m) between the sheet catalysts and a gas flow rate Ug (m/s), is given as follows:

$$80B^2 \cdot Ug \leq L \leq 300B^2 \cdot Ug$$

Figure 6:
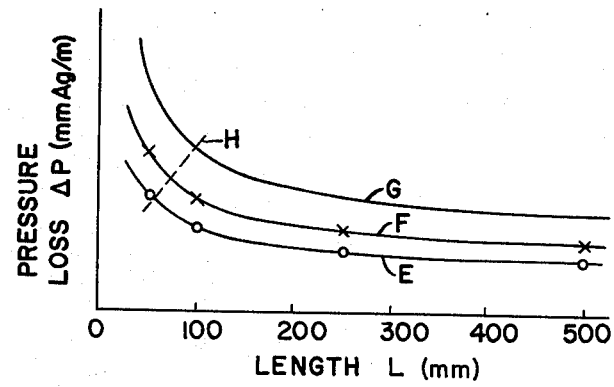
FIG. 6 is a graph showing relations between gas pressures $\Delta P$ and length L of each of a plurality of sheet catalysts.
Figure 7:
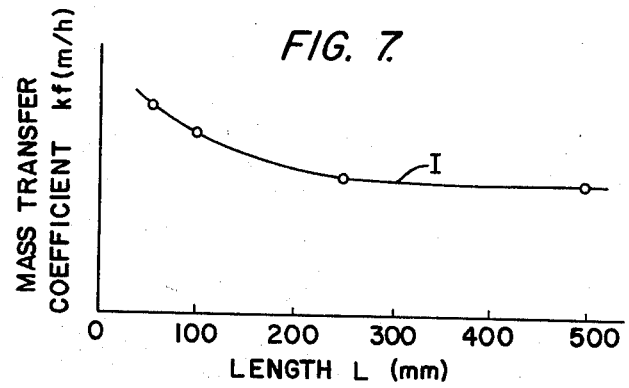
FIG. 7 is a graph showing a relation between mass transfer coefficient of a gas and the length L.

In FIG. 6, curves E, F and G show relations between pressure losses ΔP (mm Aq/m) and the length L (mm), when sheet catalysts of various length L are arranged as shown in FIG. 1, with distances B of 0.01 m therebetween, and when a gas is introduced into the sheet catalyst arrangement at velocities of 8.5 m/s (curve E), 10 m/s (curve F), and 12.5 m/s (curve G).

It is noted that when the length is to the left of the line H for each of the curves E, F and G, the pressure loss of the gas is too large for the catalyst arrangement to be used. Based on this relation, the lower limit of the length L is determined. Therefore, when the length L is too short to satisfy the above equation, the pressure loss becomes too large for the sheet catalysts to be used. In FIG. 7, there is shown a curve I expressing a relation between mass transfer coefficient kf (m/h) and the length L of the sheet catalyst, when the sheet catalyst is of various length L, and arranged as shown in FIG. 1 with the distance B of 0.01 m therebetween, and when a gas is introduced into the sheet catalyst arrangement at a velocity of 10 m/s. It is noted that the mass transfer coefficient does not increase where the length L is longer than 300 mm. Based on the relation, the upper limit of the length L is determined so that the other values of the distance B and the gas velocity Ug will be adapted. Therefore, when the length L is too large to meet the above equation, high Sh can not be expected, so that a sufficient catalytic reaction will not be effected.

As the sheet catalyst, an undulating plate catalyst, a sheet-shaped plate catalyst formed of a gas permeable catalyst carrier such as a wire net carrying thereon catalyst particles, or the like may be used.

Figure 3:
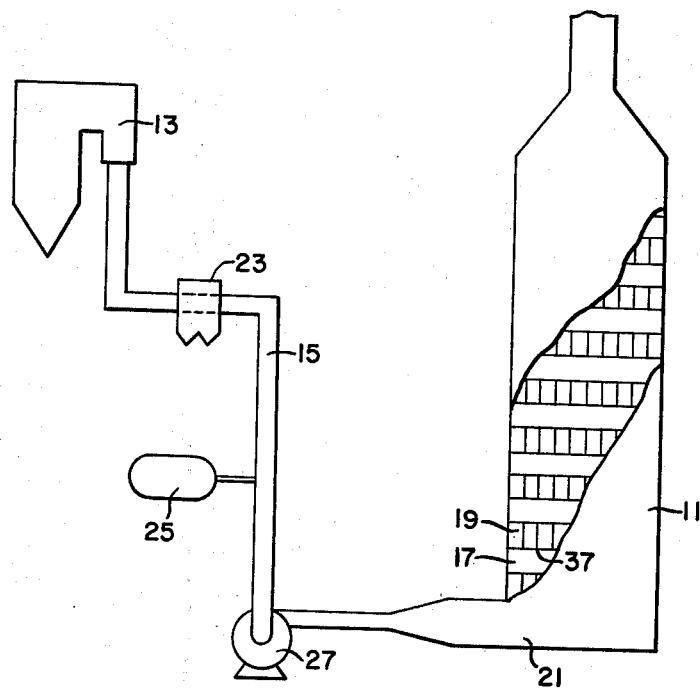
FIG. 3 is a partially sectional view of an embodiment of a catalytic reactor according to the invention.

Next, an embodiment of a catalytic reactor according to the invention in which the catalyst arrangement as shown in FIG. 1 is employed will be described hereinafter in detail, referring to FIG. 3. FIG. 3 shows a denitration apparatus in which nitrogen oxides in a waste flue gas from a boiler is made harmless by using ammonia as a reducing agent.

In FIG. 3, a catalytic reactor 11 communicates with a boiler 13 through a flue 15. In the catalytic reactor 11, a plurality of catalyst assemblies 17, 19 are stacked, and one end of the flue 15 is provided between the lowest catalyst assembly 17 and the bottom 21 of the catalytic reactor 11. The flue 15 is provided with a dust collector 23, a container 25 for ammonia, and a blower 27.

A flue gas to be treated from the boiler 13 is introduced into the lower portion of the catalytic reactor 11, rises upward passing through the catalyst assemblies 17, 19 and goes out of the catalytic reactor 11, which flue gas has had dusts removed therefrom by the dust collector 23, and ammonia injected from the container 25, before reaching the blower 27, and the flue gas mixed with ammonia contacts with catalyst to effect catalytic reaction while rising through the catalyst assemblies 17, 19.

Figure 4:
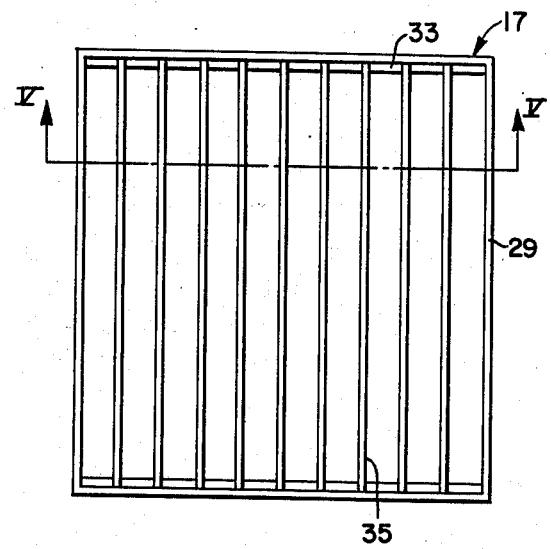
FIG. 4 is a plane view of a catalyst assembly adapted in the catalytic reactor of FIG. 3.
Figure 5:
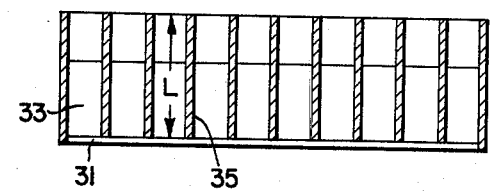
FIG. 5 is a section view of the catalyst assembly taken along a line V—V in FIG. 4.

The catalyst assemblies 17, 19 each are constructed as shown in FIGS. 4 and 5.

In FIG. 4, and FIG. 5, a frame 29 is square and provided with retaining portions 31. A plurality of spacers 33 are secured to the frame 29 with gaps therebetween. A plurality of sheet catalysts 35 each are inserted into the gaps defined by the spacers 33, and retained by the retaining portions 31 of the frame 29, whereby the sheet catalysts 35 are held by the frame 29. The sheet catalyst 35 is a thin metal plate comprising mainly titanium and vanadium. The catalyst assemblies 17, 19 are arranged in the catalytic reactor 11 in such a manner that the width directions of the sheet catalysts of the catalyst assembly 17 will cross the width directions of the sheet catalysts of the immediately adjacent catalyst assembly 19 at a right angle, so that the edge portions 35 of the sheet catalysts 17, 19 will be exposed to the gas rising in the catalytic reactor.

The specification and operation conditions of the catalytic reactor are as follows:

Horizontal cross-sectional area of the catalytic reactor: 425 cm²

Distance B between the sheet catalysts 35: about 10 mm

Length L of each sheet catalyst: about 150 mm

Number of the catalyst assemblies 17, 19 stacked: 15

The total height of the catalyst assemblies 17, 19 stacked: 2.3 m

Amount of gas to be treated: 1500 N m³/h

Velocity of the gas: 7 m/s

As the result of the denitration of the boiler flue gas, the denitration rate was 99%.

On the other hand, the denitration rate was 90% in the case where the conventional catalyst arrangement, in which sheet catalysts are in length equal to the height of the catalyst filling layers, is used. In order to obtain the same denitration rate as obtained using the above-mentioned embodiment according to the invention, it is necessary that the height of the filling layer of the sheet catalyst (that is the length of the sheet catalyst) be 4.2 m. Accordingly, even if the height of the catalyst filling layer of the catalytic reactor according to the invention is reduced to half, the denitration rate will be the same as in the conventional catalytic reactor.

As abovementioned, according to the invention, a reaction between a gas and solid material can be effected at higher efficiency, as compared with conventional catalytic reactors, and an amount of catalyst filled in the catalytic reactor can be reduced greatly. Further the reactor can be made small without being made complicated, as compared to the conventional reactor.

What is claimed is:

1. A catalytic reactor in which is produced a catalytic reaction of a gas to be treated, comprising:

a reaction chamber; inlet means for passing said gas into one end of said reaction chamber, outlet means for removing gases from an opposite end of said reaction chamber, whereby said gas flows in a direction through said reaction chamber from said inlet means to said outlet means; a plurality of catalyst groups disposed in the reaction chamber, and stacked on one another in the direction of gas flow, each of said catalyst groups including a plurality of sheet catalysts arranged in parallel to each other and separated from each other a sufficient distance such that drafting resistance is minimized, thereby to provide a plurality of gas passages, the gas passages extending parallel to the gas flow direction;

each of said sheet catalysts having a length and a width, the length extending in a direction parallel to the gas flow direction, the width extending in a direction perpendicular to the gas flow direction, with each sheet catalyst being thin in comparison to its length and width, the width being larger than the length, with the edge of each sheet catalyst which the gas initially contacts as it flows in the gas flow direction being the leading edge of the sheet, with one of the edges extending along the width constituting said leading edge, and with the width directions of said sheet catalysts in each of said catalyst groups extending in a direction traversing the width directions of the sheet catalysts in the immediately adjacent catalyst groups, whereby the Sherwood number of the gas increases as the gas passes the leading edge of the sheets in each of said catalyst groups.

2. The catalyst reactor as defined in claim 1, wherein each of the plurality of sheet catalytic has a rectangular shape.

3. The catalytic reactor as defined in claim 1, wherein the inlet means is positioned to pass the gas into the bottom end of the reaction chamber and the outlet means is positioned to remove the gas from the top end of the reaction chamber, so that the gas rises in said reaction chamber, with the plurality of gas passages of each of said catalyst groups being in a gas rising direction.

4. A catalytic reactor in which is produced a catalytic reaction of a gas to be treated, comprising:
a reaction chamber; inlet means for passing said gas into the bottom end of said reaction chamber; outlet means for removing gases from the top end of said reaction chamber, whereby said gas flows in a vertical direction through said reaction chamber from said inlet means to said outlet means; a plurality of catalyst assemblies disposed in the reaction chamber, and stacked in a gas flow direction such that one of said catalyst assemblies contacts a vertically adjacent catalyst assembly, each of said catalyst assemblies including a plurality of sheet catalysts, each of said sheet catalysts having a length and a width, with each sheet catalyst being thin in comparison to its length and width, with the width of each sheet catalyst being larger than its length; and means for arranging the plurality of sheet catalysts in each assembly parallel to and spaced from each other, whereby gas passages are formed between the sheet catalysts in each assembly, said sheet catalysts being spaced a sufficient distance apart such that drafting resistance is minimized, and for positioning the sheet catalysts in each assembly so that the gas passages extend in the vertical direction in which the gas flows; with the plurality of catalyst assemblies being stacked such that the length directions of the plurality of sheet catalysts in each assembly extend in the vertical gas flow direction and the width of the sheet catalysts of one of the catalyst assemblies extends in a direction traversing the direction which the width of the sheet catalysts of an immediately adjacent catalyst assembly extends.

5. The catalytic reactor as defined in claim 4, wherein the width directions of said sheet catalysts of one of said catalyst assemblies traverses the direction of the widths of said sheet catalysts of the immediately adjacent catalyst assembly at a right angle.

6. The catalytic reactor as defined in claim 5, wherein all of said plurality of catalyst assemblies are constructed with the same dimensions.

7. The catalytic reactor as defined in claims 4, 5 or 6, including means for passing the gas through the plurality of catalyst assemblies at a velocity of between 3 m/$_s$ and 15 m/$_s$, and wherein the length L (m) of each of the sheet catalysts is given as follows:

$$80B^2 \cdot Ug \leq L \leq 300B^2 \cdot Ug$$

wherein B=0.01 m and, in meters, is the distance between the sheet catalysts and Ug is between 3 m/s and 15 m/s, and, in meters per second, is said velocity of the gas passing through the plurality of catalyst assemblies.

8. The catalytic reactor as defined in claim 7, wherein the means for passing the gas through the plurality of catalyst assemblies at a velocity of between 3 m/s and 15 m/s is a means for passing the gas through the plurality of catalyst assemblies at a velocity of between 7.0 m/s and 12.5 m/s, and wherein Ug is between 7.0 m/s and 12.5 m/s.

9. The catalytic reactor as defined in claim 1 or 4, wherein said length of each catalyst sheet is no longer than 300 mm.

10. The catalytic reactor as defined in claim 1 or 4, wherein the inlet means is in gas flow communication with a boiler through a flue connected to the boiler, whereby a flue gas from said boiler is treated.

11. The catalytic reactor as defined in claim 10, wherein each of said sheet catalysts is comprised of titanium and vanadium.

* * * * *